(12) United States Patent
Fan et al.

(10) Patent No.: US 12,304,011 B2
(45) Date of Patent: May 20, 2025

(54) RAIL WELDING METHOD AND DEVICE

(71) Applicant: DEZHOU UNIVERSITY, Shandong (CN)

(72) Inventors: Kaiguo Fan, Shandong (CN); Zhiming Zhu, Shandong (CN); Rujun Sun, Shandong (CN); Yan Zhao, Shandong (CN); Jihai Wang, Shandong (CN); Junliang Zhang, Shandong (CN); Jili Tian, Shandong (CN); Yang Liu, Shandong (CN); Chao Chen, Shandong (CN); Guanyu Ji, Shandong (CN); Jing Li, Shandong (CN); Bin Yang, Shandong (CN)

(73) Assignee: DEZHOU UNIVERSITY, Shandong (CN)

( * ) Notice: Subject to any disclaimer, the term of this patent is extended or adjusted under 35 U.S.C. 154(b) by 0 days.

(21) Appl. No.: 18/251,662

(22) PCT Filed: Jan. 20, 2022

(86) PCT No.: PCT/CN2022/072996
§ 371 (c)(1),
(2) Date: May 3, 2023

(87) PCT Pub. No.: WO2022/213708
PCT Pub. Date: Oct. 13, 2022

(65) Prior Publication Data
US 2024/0024977 A1    Jan. 25, 2024

(30) Foreign Application Priority Data
Apr. 7, 2021   (CN) .......................... 202110371492.5

(51) Int. Cl.
B23K 9/025    (2006.01)
B23K 9/00    (2006.01)
(Continued)

(52) U.S. Cl.
CPC .............. B23K 9/02 (2013.01); B23K 9/0026 (2013.01); B23K 9/0213 (2013.01);
(Continued)

(58) Field of Classification Search
CPC ...... B23K 9/02; B23K 9/0213; B23K 9/0216; B23K 9/025; B23K 9/035; B23K 9/295;
(Continued)

(56) References Cited

U.S. PATENT DOCUMENTS 3,171,013 A * 2/1965 Francois ................ B23K 9/038
228/256
5,605,283 A * 2/1997 Lahnsteiner ............ E01B 11/50
238/163
(Continued)

FOREIGN PATENT DOCUMENTS

CN    1281078 A    1/2001
CN    105855744 A    8/2016
(Continued)

OTHER PUBLICATIONS

Machine English Translation of CN-111037038-B (Year: 2021).*
(Continued)

Primary Examiner — Jeffrey T Carley
Assistant Examiner — Erwin J Wunderlich
(74) Attorney, Agent, or Firm — Alston & Bird LLP

(57) ABSTRACT

A rail welding method and device are provided. The method includes: welding a bottom of rail, wherein welding is repeatedly performed along a first swing trajectory in a lengthwise direction of a weld seam, from one end of the bottom of rail to the other end of the bottom of rail; welding a waist of rail, wherein welding is repeatedly performed in the lengthwise direction of the weld seam along a second swing trajectory, from one end of the waist of rail, and the second swing trajectory is divided into two regions for (Continued)

respective welding in a width direction of the weld seam; and welding a head of rail, wherein welding is performed in the lengthwise direction of the weld seam along the first swing trajectory, between one end of the head of rail and the other end of the head of rail.

7 Claims, 3 Drawing Sheets

(51) Int. Cl.
| | |
|---|---|
| *B23K 9/02* | (2006.01) |
| *B23K 9/035* | (2006.01) |
| *B23K 9/173* | (2006.01) |
| *B23K 9/29* | (2006.01) |
| *B23K 15/00* | (2006.01) |
| *B23K 25/00* | (2006.01) |
| *B23K 26/26* | (2014.01) |
| *B23K 101/26* | (2006.01) |
| *B23K 10/02* | (2006.01) |

(52) U.S. Cl.
CPC ............ *B23K 9/0216* (2013.01); *B23K 9/025* (2013.01); *B23K 9/035* (2013.01); *B23K 9/173* (2013.01); *B23K 9/295* (2013.01); *B23K 25/00* (2013.01); *B23K 25/005* (2013.01); *B23K 10/02* (2013.01); *B23K 15/006* (2013.01); *B23K 26/26* (2013.01); *B23K 2101/26* (2018.08)

(58) Field of Classification Search
CPC ... B23K 25/00; B23K 25/005; B23K 2101/02
See application file for complete search history.

(56) References Cited

U.S. PATENT DOCUMENTS

| | | | | |
|---|---|---|---|---|
| 6,166,347 | A * | 12/2000 | Morlock | E01B 29/42 238/164 |
| 6,278,074 | B1 * | 8/2001 | Morlock | E01B 29/42 901/42 |
| 6,407,364 | B1 * | 6/2002 | Mumaw | B23K 9/0216 219/124.34 |
| 7,397,015 | B2 * | 7/2008 | Peters | B23K 9/0216 219/130.51 |
| 8,110,772 | B1 * | 2/2012 | Bong | B23K 25/00 219/73.1 |
| 9,334,546 | B2 * | 5/2016 | Kristan | C21D 1/62 |
| 9,908,198 | B2 * | 3/2018 | Vaia | B23K 11/046 |
| 10,835,993 | B2 * | 11/2020 | Matsuoka | B23K 26/244 |
| 2004/0010342 | A1 * | 1/2004 | Thelen | B23K 9/173 700/245 |
| 2018/0147647 | A1 * | 5/2018 | Wang | B23K 9/173 |
| 2020/0086427 | A1 * | 3/2020 | Komatsu | B23K 26/0876 |
| 2020/0398376 | A1 * | 12/2020 | Watanabe | B23K 37/0461 |
| 2022/0388088 | A1 * | 12/2022 | Wang | H02K 9/28 |

FOREIGN PATENT DOCUMENTS

| | | | | |
|---|---|---|---|---|
| CN | 113042855 | A | | 6/2021 |
| CN | 111037038 | B * | | 9/2021 ............. B23K 9/00 |
| CN | 113042855 | B | | 3/2023 |
| JP | H07290242 | A * | | 11/1995 |
| JP | 2003-260564 | A | | 9/2003 |
| JP | 2010115700 | A * | | 5/2010 |
| JP | 2013027895 | A * | | 2/2013 |
| WO | WO-2017043086 | A1 * | | 3/2017 ............. B23K 33/00 |

OTHER PUBLICATIONS

Machine English Translation of JP-H07290242-A (Year: 1995).*
Machine English Translation of JP-2010115700-A (Year: 2010).*
Machine English Translation of JP-2013027895-A (Year: 2013).*
Machine English Translation of WO-2017043086-A1 (Year: 2017).*
Fan Kaiguo, "Process Optimization on Automatic Narrow Gap Arc Rail Welding and Its Engineering Application in Low Atmospheric Pressure Environment," Dissertation, 155 pages, (Apr. 2015).
Liu Zhengwen et al., "Stability Analysis and Control of Welding Current for Automatic Rail Narrow-gap Arc Welding System," Journal of Mechanical Engineering, 47(8):110-115, (Apr. 2011).
Liu Zhengwen et al., "Automatic Offset Correction System of Narrow Garp Arc Welding Torch for Rail," Transactions of the China Welding Institution, 32(5):45-48, (May 25, 2011).
International Search Report received for International Patent Application No. PCT/CN2022/072996, mailed on Apr. 1, 2022, 3 pages (English Translation only).
Notification to Grant Patent Right for Invention received for Chinese Patent Application No. 202110371492.5, mailed on Dec. 30, 2022, 2 pages (English Translation included).
Office Action received for Chinese Patent Application No. 202110371492.5, mailed on Jun. 11, 2022, 12 pages (English Translation included).

* cited by examiner

RAIL WELDING METHOD AND DEVICE

CROSS REFERENCE TO RELATED APPLICATIONS

This application is a National Stage Application, filed under 35 U.S.C. § 371, of International Application No. PCT/CN2022/072996, filed Jan. 20, 2022, which international application claims priority to China Application No. 202110371492, filed on Apr. 7, 2021 in China National Intellectual Property Administration and entitled "RAIL WELDING METHOD AND DEVICE", which application is hereby incorporated by reference in its entirety.

BACKGROUND

Technical Field

The present disclosure relates to the technical field of welding, specifically, to a rail welding method and device.

Description of Related Art

With the development trend of high-speed and heavy-load modern railways, trains also put forward higher requirements for running tracks using jointless construction with higher quality and higher operational capacity. Due to the limitation of rail manufacturing and transportation, a welding technology needs be adopted in laying and daily maintenance of jointless tracks. The existing rail welding technology can be divided into mobile welding and in-situ welding according to different application occasions, and the in-situ welding technology can also be divided into thermit welding and manual forced forming arc welding.

At present, thermit welding is the only in-situ rail welding technology adopted in China. However, the thermit welded joint is the weakest procedure in a current jointless track due to its internal cast structure and low welded joint performance, so that the thermit welding is unable to meet the growing needs of modern railways. In the manual forced forming arc welding, the performance of a welded joint is high, but the quality of the welded joint is greatly affected by human factors, and the manual forced forming arc welding is only widely used in Japan. Therefore, developing an automatic rail arc welding technology is of great significance to improve the joint quality of the jointless track.

In the rail automatic arc welding technology, welding process trajectory parameters directly determine the performance quality of welded joints, and welding automation equipment is determined for the realization of welding process. The existing rail arc welding technology mainly adopts the manual forced forming arc welding, for example, weld preheating is required. Welding wires with different components are used to weld different portions of a rail section by section, or using the gas shielded welding technology. The welding is continuous during the automatic rail arc welding, and it is difficult to replace the welding wires. The existing manual arc welding technology cannot meet the requirements of the automatic rail arc welding.

In addition, the in-situ rail welding technology is mainly used for welding operations in the field, so a self-shielded flux-cored wire is required. Compared with the gas shielded welding, the self-shielded flux-cored wire does not need an additional protective gas source during welding, and a welding gun is simple in structure, light in weight and easy to operate. The self-shielded flux-cored wire has excellent wind resistance, so that it can be usually used to perform welding smoothly under force-four wind. The self-shielded flux-cored wire has a low requirement for the assembling size and has excellent rust resistance. The self-shielded flux-cored wire is widely used in oil pipelines, field buildings, ships and oil platforms. The self-shielded flux-cored wire also has some shortcomings in welding. For example, technical parameters are low in adaptability, the welding technology and a welded joint have poor corresponding repeatability in mechanical properties. It is difficult to control the welding technology and control the transition of molten drops and there is also splashing, a lot of smoke and so on.

In view of the above problems, there is no good welding technology that can meet the requirements of the automatic rail arc welding.

BRIEF SUMMARY

In view of the above situation, the present disclosure formulates the rail automatic arc welding process according to the characteristics and requirements of rail automatic arc welding. This technology mainly includes welding gun movement control, welding gun movement trajectory and the corresponding welding process parameters. The different technological parameters are used according to the shape of different parts of the rail bottom, rail waist, rail and welding heat input characteristics in the welding process to realize the automatic arc welding of rail joint.

A rail welding method is provided, the rail including a bottom of rail, a waist of rail and a head of rail. Weld joints of the rail adopt vertical grooves, and are welded using a narrow-gap side wall fusion welding method. The method includes:

welding a bottom of rail, wherein welding is repeatedly performed along a first swing trajectory in a lengthwise direction of a weld seam, from one end of the bottom of rail to the other end of the bottom of rail, to form multiple weld layers, wherein the first swing trajectory includes:

linearly welding a welding wire tip for a first side wall welding length from a position at a second preset distance from a side wall to the other end of the bottom of rail, then performing welding in an arc to a position at the second preset distance from the other side wall, performing linearly welding for the first side wall welding length to the other end of the bottom of rail, and performing welding in an arc again to a position at the second preset distance from the side wall;

welding a waist of rail, wherein welding is repeatedly performed in the lengthwise direction of the weld seam along a second swing trajectory, from one end of the waist of rail, to form multiple weld layers, wherein the second swing trajectory is divided into two regions for respective welding in a width direction of the weld seam; and welding a head of rail, wherein welding is performed in the lengthwise direction of the weld seam along the first swing trajectory, between one end of the head of rail and the other end of the head of rail, to form multiple weld layers.

Optionally, the linearly welding a welding wire tip for a first side wall welding length from a position at a second preset distance from a side wall to the other end of the bottom of rail, then performing welding in an arc to a position at the second preset distance from the other side wall, performing linearly welding for the first side wall welding length to the other end of the bottom of rail, and performing welding in an arc again to a position at the second preset distance from the side wall includes:

performing towards one end of the bottom of rail, welding from a position at a first preset distance from the side wall to a position at the second preset distance from the side wall, wherein an angle between the wire tip and the side wall is within a range of 0° to 45° at the second preset distance;

performing linear welding for the first side wall welding length to the other end of the bottom of rail, and then welding in an arc to a position at the first preset distance from the other side wall, wherein an angle of welding in an arc is within a range of 130° to 180°;

performing, towards one end of the bottom of rail, welding to a position at the second preset distance from the other side wall, wherein an angle between the wire tip and the side wall is within a range of 0° to 45° at the second preset distance;

then performing linear welding for the first side wall welding length to the other end of the bottom of rail, and then welding in an arc to a position at the first preset distance from the side wall, wherein an angle of welding in an arc is within a range of 130° to 180°;

wherein the second preset distance is shorter than the first preset distance.

Optionally, the second swing trajectory includes:

performing welding to a position at a third preset distance from the side wall, from a center of the weld seam at one end of the waist of rail to the side wall;

then performing linear welding to the other end of the waist of rail;

performing weaving welding to a position at the third preset distance from the other side wall, and performing linear welding to one end of the waist of rail;

performing weaving welding back to the center of the weld seam at one end of the waist of rail, performing welding to the other end of the waist of rail along a center line of the weld seam, performing, towards the side wall, welding to the position at the third preset distance from the side wall;

performing linear welding towards one end of the waist of rail, and performing weaving welding to the position at the third preset distance from the other side wall;

performing linear welding to the other end of the waist of rail;

performing weaving welding to the center of the weld seam at the other end of the waist of rail;

performing lifting back to the center of the weld seam at one end of the waist of rail along the center line of the weld seam.

Optionally, in the welding of the bottom of rail, after the welding is performed from one end of the bottom of rail to the other end of the bottom of rail along the first swing trajectory in the lengthwise direction of the weld seam, a welding gun is lifted to be moved to one end of the bottom of rail along the center line of the weld seam, and the welding along the first swing trajectory is performed;

in the welding of the head of rail, after the welding is performed from one end of the bottom of rail to the other end of the bottom of rail along the first swing trajectory in the lengthwise direction of the weld seam, the welding along the first swing trajectory is then performed from the other end of the bottom of rail to the other end of the bottom of rail.

Optionally, a value of the second preset distance is between 0.5 mm and 4 mm; and the first side wall welding length is 4 mm to 16 mm.

Optionally, before the first swing trajectory, the welding gun does a linear motion to be ignited along the center line of the weld seam, and swings at an angle of 40° to 90° to the position at the first preset distance from the side wall.

Optionally, a self-shielded flux-cored wire is used for welding.

Optionally, a width of the weld seam is between 15 mm and 23 mm.

Optionally, a welding current for the bottom of rail is 170 A to 260 A, and an arc voltage is 19 V to 25.5 V, wherein a welding current for a first layer is 170 A to 210 A, and an arc voltage is 19 V to 23 V; a welding current for other layers of the bottom of rail is 200 A to 260 A, and an arc voltage is 20.5 V to 25.5 V;

a welding current for the waist of rail is 220 A to 250 A, and an arc voltage is 21 V to 25 V; and a welding current for the head of rail is 200 A to 240 A, and an arc voltage is 21 V to 25 V.

The present disclosure further provides a rail welding device, including:

a module for welding a bottom of rail, configured to control a welding gun to perform repeated welding along a first swing trajectory in a lengthwise direction of a weld seam, from one end of the bottom of rail to the other end of the bottom of rail, to form multiple weld layers;

further including a first swing trajectory unit, configured to control the welding gun to complete a first swing trajectory, the first swing trajectory includes:

performing, towards one end of the bottom of rail, oblique welding from a position at a first preset distance from a side wall to a position at a second preset distance from the side wall;

then performing linear welding for a first side wall welding length towards the other end of the bottom of rail; performing welding in an arc to a position at the first preset distance from the other side wall; performing, towards one end of the bottom of rail, oblique welding to a position at the second preset distance from the other side wall; performing linear welding for the first side wall welding length towards the other end of the bottom of rail; and performing welding in an arc to the position at the first preset distance from the side wall, wherein the second preset distance is shorter than the first preset distance;

a module for welding a waist of rail, configured to control the welding gun to perform repeated welding in the lengthwise direction of the weld seam along a second swing trajectory, from one end of the waist of rail, to form multiple weld layers;

further including a second swing trajectory unit, configured to control the welding gun to complete the second swing trajectory, the second swing trajectory including:

performing welding to a position at a third preset distance from the side wall, from a center of the weld seam at one end of the waist of rail to the side wall;

then performing linear welding to the other end of the waist of rail;

performing weaving welding to a position at the third preset distance from the other side wall, performing linear welding to one end of the waist of rail;

performing weaving welding back to the center of the weld seam at one end of the waist of rail, performing welding to the other end of the waist of rail along a center line of the weld seam, performing, towards the side wall, welding to the position at the third preset distance from the side wall;

performing linear welding towards one end of the waist of rail, performing welding to the position at the third preset distance from the other side wall;

performing linear welding to the other end of the waist of rail;

performing welding to the center of the weld seam at the other end of the waist of rail; and performing lifting back to the center of the weld seam at one end of the waist of rail along the center line of the weld seam; and a module for welding a head of rail, configured to control the welding gun to perform welding in the lengthwise direction of the weld seam along the first swing trajectory, between one end of the head of rail and the other end of the head of rail, to form multiple weld layers.

The present disclosure further discloses an electronic device, including a memory and at least one processor, wherein the memory stores at least one instruction, and the at least one instruction, when executed by the at least one processor, implements the above rail welding method.

The present disclosure has the following beneficial effects:

(1) The welding process is easy to operate. Weld preheating is not necessary, so that the complexity of a high-carbon welding technology is reduced. The welding method has an extremely high practical promotion value.

(2) The automatic arc welding process can be completed by using the self-shielded flux-cored welding wire if the rail adopts a vertical groove. By adopting the welding technology and trajectories of the present disclosure, the welding process is highly repeatable, and welded joints have stable and reliable quality and high performance. The mechanical properties of the welded joints can meet mechanical testing requirements such as static bending and drop weight of the national standard of flash welding.

(3) A welding trajectory has a very good adaptability. Welding parameters can be adjusted as a width D of the weld seam and the second preset distance D1 change, so as to ensure a sufficient fusion amount, uniformity and consistency of side wall fusion.

(4) In the welding of the bottom of rail, a combination of the first swing trajectory welding and linear movement is adopted to ensure uniform heat input between weld layers.

BRIEF DESCRIPTION OF THE FIGURES

The above features and technical advantages of the present disclosure will become clearer and easier to understand by describing the embodiments in combination with the following drawings.

DETAILED DESCRIPTION OF VARIOUS EMBODIMENTS

Figure 1:
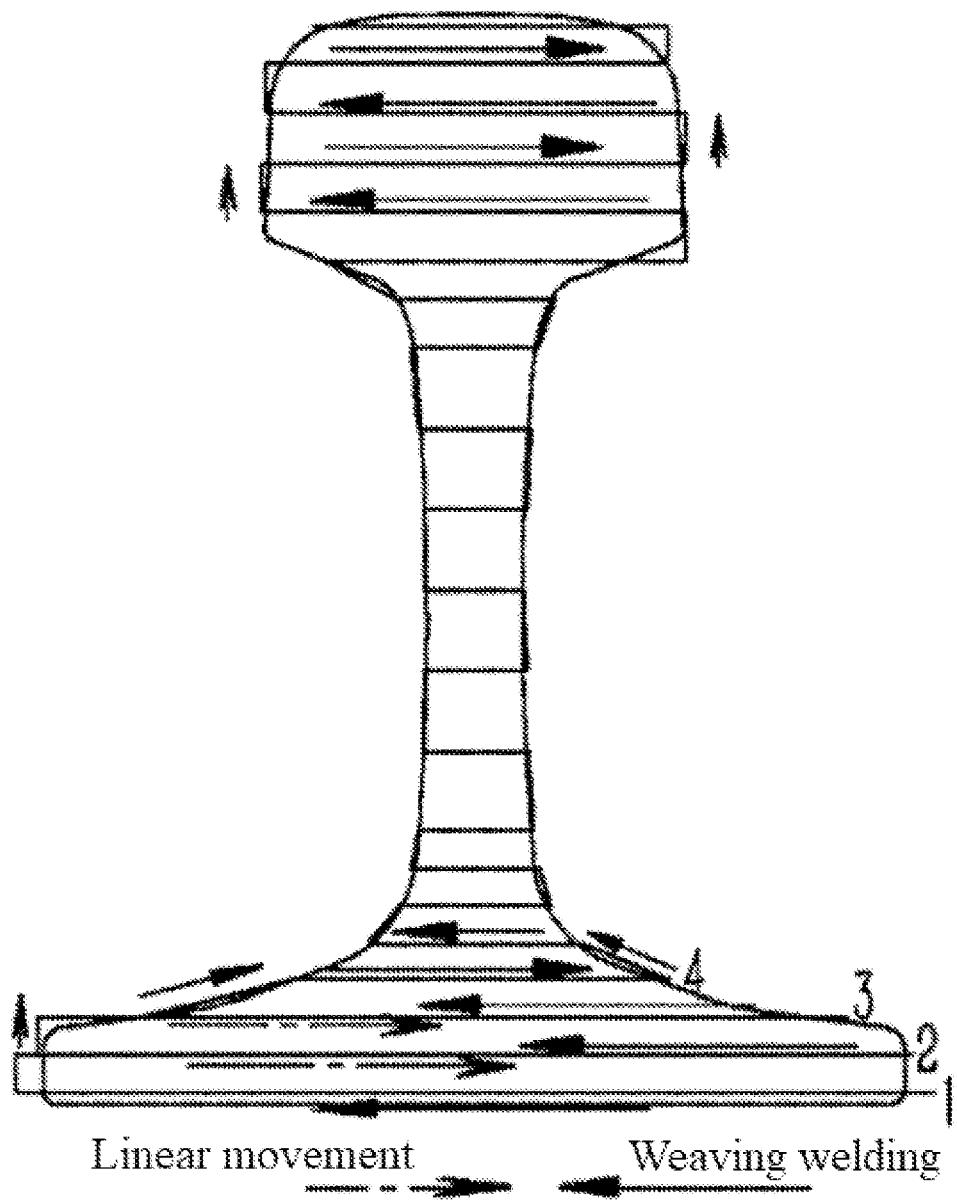
FIG. 1 is a cross-section view of rail welding process according to an embodiment of the present disclosure.

The embodiments of the present disclosure will be described below with reference to the accompanying drawings. Persons of ordinary skill in the art can recognize that the described embodiments can be modified in various different ways or combinations without departing from the spirit and scope of the present disclosure. Therefore, the drawings and descriptions are illustrative in nature and are not intended to limit the scope of protection of the claims. In addition, in this specification, the drawings are not drawn to really scale, and same reference numerals represent same parts.

The rail welding method of this embodiment is used for welding between rails. The rail 100 includes a head of rail, a waist of rail below the head of rail and a bottom of rail below the waist of rail. A width of the head of rail is greater than that of the waist of rail and less than that of the bottom of rail. Considering field working conditions and an operation time requirement, weld seams of the rail adopt vertical grooves. A welding material adopts a self-shielded flux-cored wire, and a narrow-gap side wall fusion welding method is adopted. A narrow gap refers to that a width of a weld seam is between 15 mm and 23 mm. In a welding process, a welding gun is controlled to move to fill a weld seam with a welding wire. Therefore, a movement trajectory of the welding gun and information such as a welding current and an arc voltage in the moving process are key to affect the performance of a welded joint. A welding current for the bottom of rail is 170 A to 260 A, and an arc voltage is 19 V to 25.5 V. A first layer adopts a welding technology in which both sides are formed while welding is performed on one side. Smaller welding technology parameters can better ensure the forming quality of a back surface of the bottom of rail. Therefore, a welding current for the first layer is 170 A to 210 A, and an arc voltage is 19 V to 23 V. Specific parameters used are related to a width of a weld seam, an external environment (such as an atmospheric pressure) and a bottom plate used for backing welding. A welding current for other layers of the bottom of rail is 200 A to 260 A, and an arc voltage is 20.5 V to 25.5 V. Specific parameters used are related to a welding position and the number of weld layers.

A welding current for the head of rail is 200 A to 240 A, and an arc voltage is 21 V to 25 V. A welding current for the waist of rail is 220 A to 250 A, and an arc voltage is 21 V to 25 V. Specific parameters used are related to a welding position and the number of weld layers.

The rail welding method includes the following steps:

Step S1: welding the bottom of rail, wherein welding is repeatedly performed in a lengthwise direction of a weld seam along a first swing trajectory, from one end of the bottom of rail to the other end of the bottom of rail, to form multiple weld layers.

Figure 2:
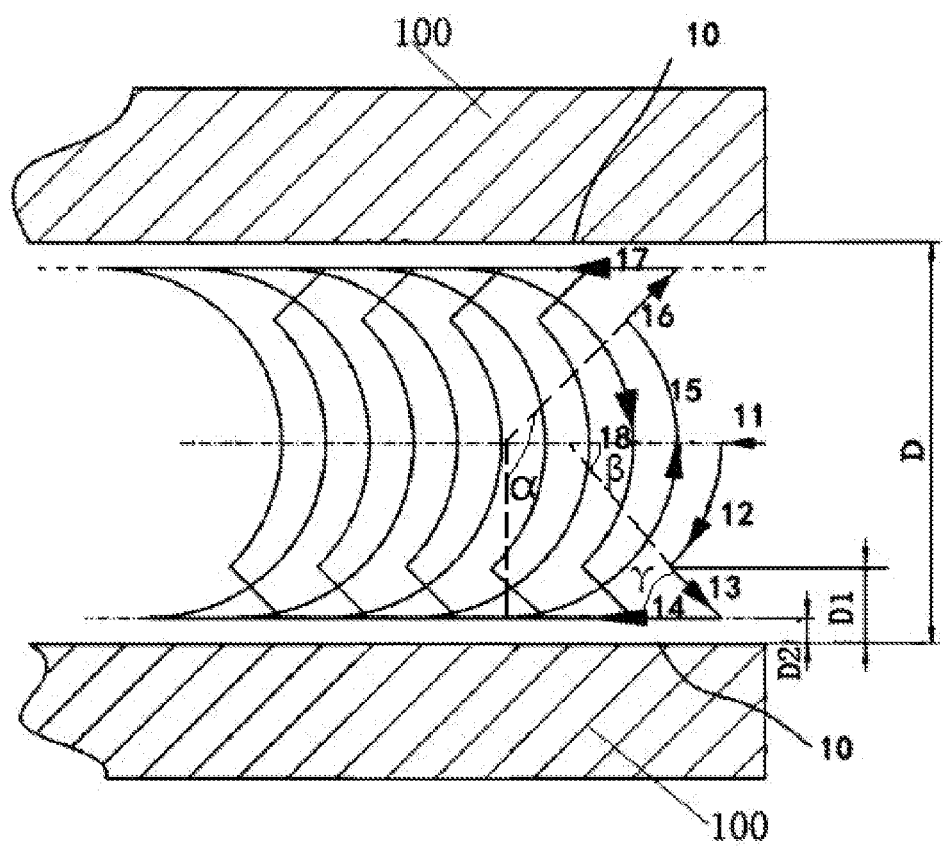
FIG. 2 is a schematic diagram of a first swing trajectory according to an embodiment of the present disclosure.

As shown in FIG. 2, before a first swing trajectory is performed for many times, trajectory 11 and trajectory 12 are first performed. In trajectory 11, a welding gun does a linear motion to be ignited along a center of the weld seam. Usually, this motion is performed on an arc striking plate. This step is mainly to ignite an arc and make the combustion stable. A motion length may be 5 mm to 10 mm. Trajectory 12 then swings to a position at a first preset distance from a side wall. This step is to achieve transition between arc striking and normal swing for cyclic welding. A swing angle β is 40° to 90°. If the weld seam D is relatively wide, there may be a linear motion in a width direction of the weld seam in this step.

Welding is then performed along the first swing trajectory from a right end (one end of the bottom of rail) to a left end (the other end of the bottom of rail). A first weld layer 1 is completed by welding along multiple first swing trajectories. The welding gun is lifted to move to one end of the bottom of rail along the center line of the weld seam.

Similarly, welding of a second weld layer 2, a third weld layer 3 and a fourth weld layer 4 can be performed successively until the welding of the bottom of rail is completed. Since the bottom of rail is relatively long, in order to ensure the uniformity and consistency of the weld seam, weaving welding and linear motion are combined to weld the bottom of rail. That is, after the welding of the first weld layer 1 is completed, and the welding gun is lifted to a certain height, the welding gun linearly moves to an arcing section (the dotted arrow below the second layer in FIG. 1) at one end of the bottom of rail along the center of the weld seam, and the welding of the second weld layer 2 is still completed by weaving welding from the arcing section. This ensures that a temperature difference between front and rear weld layers is not too large during the welding of each layer, so that the whole weld seam is heated uniformly. The subsequent welding of the third weld layer 3 and fourth weld layer 4 is similar to the welding of the second weld layer 2. The specific number of weld layers to be welded for the bottom of rail is related to different rail models, and will not be limited here.

Further, the first swing trajectory includes:

In trajectory 13, oblique welding is performed, towards one end of the bottom of rail, from a position at a first preset distance D1 from a side wall 10 to a position at a second preset distance D2 from the side wall 10. A value of the second preset distance is between 0.5 mm and 4 mm. An angle γ between a wire tip and the side wall is within a range of 0° to 45° at the second preset distance.

In trajectory 14, linear welding is performed for a first side wall welding length towards the other end of the bottom of rail. Trajectory 14 adopts narrow-gap side wall welding. The first side wall welding length may be 4 mm to 16 mm. Furthermore, in the first swing trajectories executed in sequence, the first side wall welding length gradually increases to a fixed value.

In trajectory 15, welding in an arc is performed to a position at the first preset distance D1 from the other side wall 10, which mainly realizes that the welding gun is moved to the other side of the weld seam during the welding of a weld seam region. A swing angle α of this step is 130° to 180°.

In trajectory 16, oblique welding is performed, towards one end of the bottom of rail, to a position at the second preset distance D2 from the other side wall, which is similar to trajectory 13, but only a swing direction is opposite.

In trajectory 17, linear welding is performed for the first side wall welding length towards the other end of the bottom of rail, which is similar to trajectory 14 and will not be described in detail here.

In trajectory 18, welding in an arc is then performed to the position at the first preset distance D1 from the side wall, which is similar to trajectory 14, but only a swing direction is opposite.

The welding of the first swing trajectory is completed once from trajectory 13 to trajectory 18. The second preset distance is shorter than the first preset distance. It should be noted that the first preset distance D1 and the second preset distance D2 of the two side walls are not strictly the same.

Figure 3:
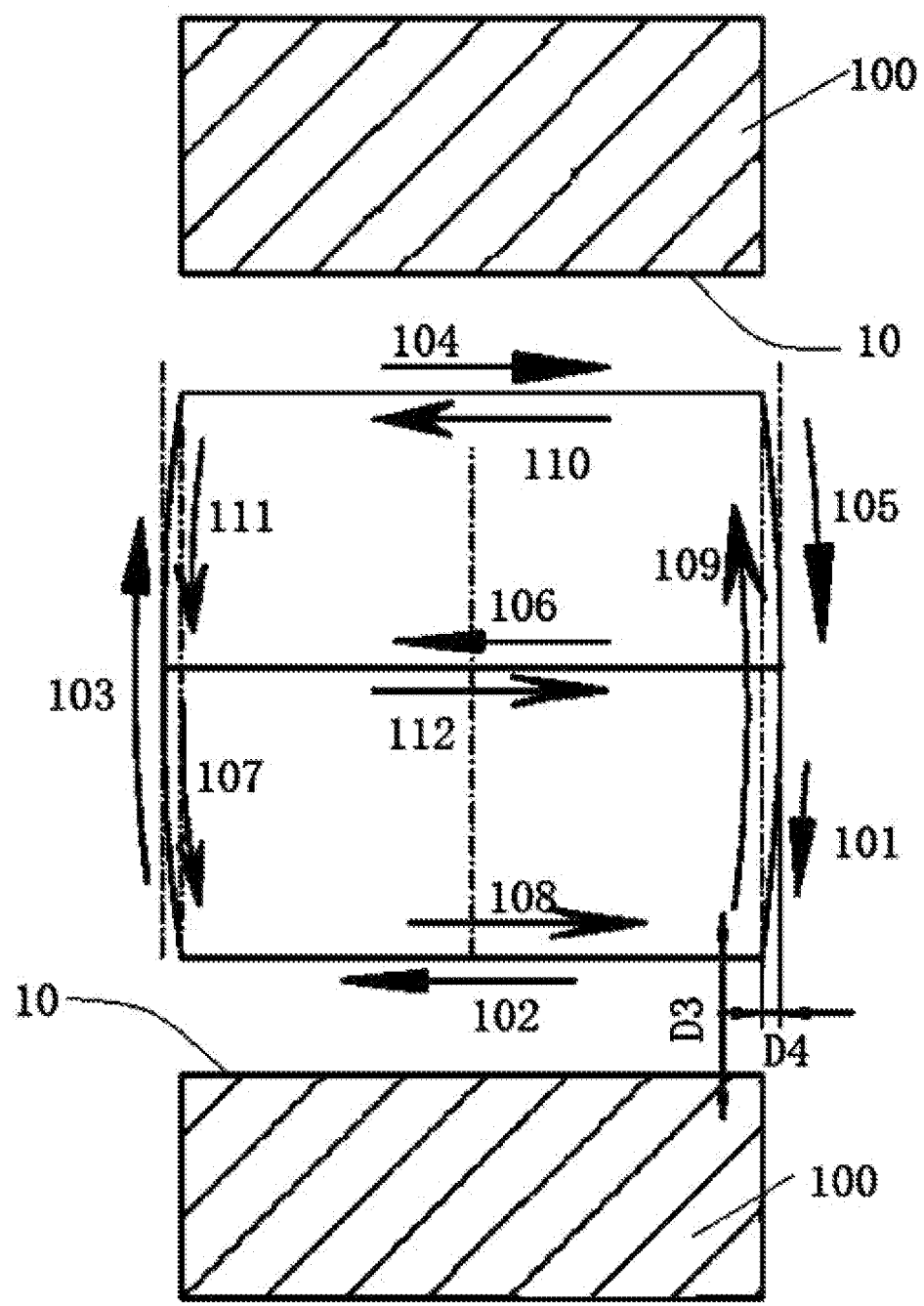
FIG. 3 is a schematic diagram of a second swing trajectory according to an embodiment of the present disclosure.

Step S2: welding a waist of rail, wherein welding is repeatedly performed in the lengthwise direction of the weld seam along a second swing trajectory, from one end of the waist of rail, to form multiple weld layers. A movement trajectory of a welding gun used for the waist of rail is as shown in FIG. 3. The welding of each layer of the waist of rail is separately performed on two ends, two side walls and a center of the weld seam. The movement trajectory of the entire welding gun is as shown in FIG. 3. A welding cycle of each layer is divided into 12 steps. Steps 101 to 106 mainly achieve welding of the left side (the upper side in FIG. 3) and completion of preparation work of welding of the right side. Steps 107 to 112 achieve welding of the right side (the lower side in FIG. 3) and completion of pre-welding preparation of welding of a next layer.

The second swing trajectory includes:

In trajectory 101, welding is performed to a position at a third preset distance D3 from the side wall, from a center of the weld seam at one end of the waist of rail to the side wall 10.

In trajectory 102, linear welding is then performed to the other end of the waist of rail to achieve fusion of the side wall.

In trajectory 103, weaving welding is performed to a position at the third preset distance D3 from the other side wall.

In trajectory 104, linear welding is performed to one end of the waist of rail to achieve fusion of the side wall.

In trajectory 105, weaving welding is performed back to the center of the weld seam at one end of the waist of rail.

In trajectory 106, welding is performed along the center line of the weld seam to the other end of the waist of rail to achieve welding of a weld seam region.

In trajectory 107, welding is performed, towards the side wall, to the position at the third preset distance D3 from the side wall.

In trajectory 108, linear welding is performed towards one end of the waist of rail.

In trajectory 109, weaving welding is performed to the position at the third preset distance D3 from the other side wall.

In trajectory 110, linear welding is performed to the other end of the waist of rail.

In trajectory 111, weaving welding is performed to the center of the weld seam at the other end of the waist of rail.

In trajectory 112, lifting is performed back to the center of the weld seam at one end of the waist of rail along the center line of the weld seam. The trajectory is a lifting and stretching movement, which is a transition of welding of two adjacent weld layers.

Step S3: welding a head of rail, wherein welding is performed in a reciprocating manner in the lengthwise direction of the weld seam along the first swing trajectory, between one end of the head of rail and the other end of the head of rail, to form multiple weld layers. The first swing trajectory of the welding of the head of rail is the same as the first swing trajectory of the welding of the bottom of rail, except that the head of rail can be welded in the reciprocating manner. That is, the welding is performed along the first swing trajectory from one end of the head of rail to the other end of the head of rail and is then performed along the first swing trajectory from the other end of the head of rail to the end of the head of rail. Of course, it is not excluded that the welding is performed along the first swing trajectory from one end of the head of rail to the other end of the head of rail; the welding gun is lifted back to one end of the head of rail; and the welding is then performed along the first swing trajectory from one end of the head of rail to the other end of the head of rail.

Further, trajectory 101, trajectory 105 and trajectory 109 are on a first circular arc, and trajectory 103, trajectory 107 and trajectory 111 are on a second circular arc. Protruding directions of the first circular arc and the second circular arc are opposite. Specifically, the first circular arc protrudes to one end of the waist of rail, and the second circular arc protrudes to the other end of the waist of rail. A depth D4 of the first and second circular arcs is between 0.5 mm and 3 mm.

The present disclosure further provides a rail welding device, including:
- a module for welding a bottom of rail, configured to control a welding gun to perform repeated welding along a first swing trajectory in a lengthwise direction of a weld seam, from one end of the bottom of rail to the other end of the bottom of rail, to form multiple weld layers;
- further including a first swing trajectory unit, configured to control the welding gun to complete a first swing trajectory, the first swing trajectory includes:
- performing, towards one end of the bottom of rail, oblique welding from a position at a first preset distance from a side wall to a position at a second preset distance from the side wall;
- then performing linear welding for a first side wall welding length towards the other end of the bottom of rail; performing welding in an arc to a position at the first preset distance from the other side wall; performing, towards one end of the bottom of rail, oblique welding to a position at the second preset distance from the other side wall; performing linear welding for the first side wall welding length towards the other end of the bottom of rail; and performing welding in an arc to the position at the first preset distance from the side wall,
- wherein the second preset distance is shorter than the first preset distance;
- a module for welding a waist of rail, configured to control the welding gun to perform repeated welding in the lengthwise direction of the weld seam along a second swing trajectory, from one end of the waist of rail, to form multiple weld layers
- further including a second swing trajectory unit, configured to control the welding gun to complete the second swing trajectory, the second swing trajectory including:
- performing welding to a position at a third preset distance from the side wall, from a center of the weld seam at one end of the waist of rail to the side wall;
- then performing linear welding to the other end of the waist of rail;
- performing weaving welding to a position at the third preset distance from the other side wall,
- performing linear welding to one end of the waist of rail;
- performing weaving welding back to the center of the weld seam at one end of the waist of rail,
- performing welding to the other end of the waist of rail along a center line of the weld seam, and
- performing, towards the side wall, welding to the position at the third preset distance from the side wall;
- performing linear welding towards one end of the waist of rail, and
- performing welding to the position at the third preset distance from the other side wall;
- performing linear welding to the other end of the waist of rail;
- performing welding to the center of the weld seam at the other end of the waist of rail; and
- performing lifting back to the center of the weld seam at one end of the waist of rail along the center line of the weld seam; and
- a module for welding a head of rail, configured to control the welding gun to perform welding in the lengthwise direction of the weld seam along the first swing trajectory, between one end of the head of rail and the other end of the head of rail, to form multiple weld layers.

The present disclosure further provides an electronic device. In this embodiment, the rail welding method can be applied to the electronic device to control rail welding trajectories. Specifically, for an electronic device that needs to perform rail welding, functions of the rail welding method of the present disclosure can be directly integrated on the electronic device, or are run on the electronic device in the form of a software development kit.

A hardware device architecture for realizing the rail welding method is described below. The electronic device includes a memory and at least one processor. The memory is configured to store program codes and various data, such as a rail welding program installed in the electronic device, and to realize high-speed and automatic accessing to the programs or the data during the running of the electronic device. The memory includes a read-only memory, a programmable read-only memory, an erasable programmable read-only memory, a one-time programmable read-only memory, an electronically erasable rewritable read-only memory, a read-only optical dis or other optical disc memories, a magnetic disk memory, a magnetic tape memory, or any other computer-readable storage media capable of carrying or storing data.

The at least one processor may be composed of integrated circuits, for example, a single packaged integrated circuit, or may be composed of multiple integrated circuits packaged with the same function or different functions, including a combination of one or more of a central processing unit, a microprocessor, a digital processing chip, a graphics processor and various control chips, and the like. The at least one processor is a control core of the electronic device, which uses various interfaces and lines to connect various components of the entire electronic device. Various functions of the electronic device and data processing, for example, the functions of the rail welding method, can be performed by means of running or executing the programs or modules stored in the memory and invoking the data stored in the memory.

The rail welding method can be divided into a plurality of functional modules composed of program code segments. The various functional modules are different program codes divided correspondingly to the above rail welding method. The program codes of the various program segments can be stored in the memory and executed by the at least one processor to implement the rail welding method.

The above descriptions are only preferred embodiments of the present disclosure, and are not intended to limit the present disclosure. For those skilled in the art, the present disclosure can have various changes and variations. Any modification, equivalent replacement, improvement, etc. made within the spirit and principle of the present disclosure shall all fall within the protection scope of the present disclosure.

What is claimed is:

1. A rail welding method, the rail comprising a bottom of rail, a waist of rail and a head of rail, wherein weld seams of the rail adopt vertical grooves, and are welded using a narrow-gap side wall fusion welding method; and the method comprises:
   welding the bottom of rail, wherein welding is repeatedly performed along a first swing trajectory in a lengthwise direction of a weld seam, from one end of the bottom of rail to an other end of the bottom of rail opposite to the one end of the bottom of rail in the lengthwise direction of the weld seam, to form multiple weld layers,
   welding the waist of rail, wherein welding is repeatedly performed in the lengthwise direction of the weld seam along a second swing trajectory, from one end of the waist of rail, to form multiple weld layers, wherein the second swing trajectory is divided into two regions for respective welding in a width direction of the weld seam; and
   after the welding of the bottom of rail and the waist of rail, welding the head of rail, wherein the welding is performed in the lengthwise direction of the weld seam along a third swing trajectory, between one end of the head of rail and an other end of the head of rail opposite to the one end of the head of rail in the lengthwise direction of the weld seam, to form multiple weld layers,
   wherein the first swing trajectory comprises:
   performing, towards the one end of the bottom of rail, linear welding from a position at a first preset distance from a side wall of the bottom of rail to a position at a second preset distance from the side wall of the bottom of rail, wherein an angle between a wire tip and the side wall of the bottom of rail is greater than 0° and less than or equal to 45° at the second preset distance;
   performing linear welding along the side wall of the bottom of rail for a first side wall welding length to the other end of the bottom of rail, and then welding in a first single arc to a position at the first preset distance from an other side wall of the bottom of rail, wherein an angle of welding in the first single arc is within a range of 130° to 180° and the first single arc protrudes to the one end of the bottom of rail;
   performing, towards the one end of the bottom of rail, linear welding to a position at the second preset distance from the other side wall of the bottom rail, wherein an angle between the wire tip and the other side wall of the bottom of rail is greater than 0° and less than or equal to 45° at the second preset distance; and
   then performing linear welding along the other side wall of the bottom of rail for the first side wall welding length to the other end of the bottom of rail, and then welding in a second single arc to a position at the first preset distance from the side wall of the bottom of rail, wherein an angle of welding in the second single arc is within a range of 130° to 180° and the second single arc protrudes to the one end of the bottom of rail;
   wherein the second preset distance is shorter than the first preset distance;
   the second swing trajectory comprises:
      performing welding in a third single arc to a position at a third preset distance from a side wall of the waist of rail, from a center of the weld seam at the one end of the waist of rail to the side wall of the waist of rail;
      then performing linear welding to an other end of the waist of rail;
      performing welding in a fourth single arc to a position at the third preset distance from an other side wall of the waist of rail,
      performing linear welding to the one end of the waist of rail;
      performing welding in a fifth single arc back to the center of the weld seam at the one end of the waist of rail,
      performing linear welding to the other end of the waist of rail along a center line of the weld seam, wherein the center line of the weld seam is parallel to the lengthwise direction of the weld seam,
      performing, towards the side wall of the waist of rail, welding in a sixth single arc to the position at the third preset distance from the side wall of the waist of rail;
      performing linear welding towards the one end of the waist of rail,
      performing welding in a seventh single arc to the position at the third preset distance from the other side wall of the waist of rail;
      performing linear welding to the other end of the waist of rail;
      performing welding in an eighth single arc to the center of the weld seam at the other end of the waist of rail;
      performing lifting back to the center of the weld seam at the one end of the waist of rail along the center line of the weld seam, wherein the third single arc, the fifth single arc, and the seventh single arc are on a first circular arc; the fourth single arc, the sixth single arc, and the eighth single arc are on a second circular arc, and wherein protruding directions of the first circular arc and the second circular arc are opposite, such that the first circular arc protrudes to the one end of the waist of rail and the second circular arc protrudes to the other end of the waist of rail, and
   wherein the third swing trajectory presents a same pattern as the first swing trajectory.

2. The rail welding method according to claim 1, wherein
   in the welding of the bottom of rail, after the welding is performed from one end of the bottom of rail to the other end of the bottom of rail along the first swing trajectory in the lengthwise direction of the weld seam, a welding gun is lifted to be moved to one end of the bottom of rail along the center line of the weld seam, and the welding along the first swing trajectory is performed; and
   in the welding of the head of rail, after the welding is performed from one end of the head of rail to the other end of the head of rail along the first swing trajectory in the lengthwise direction of the weld seam, the welding along the first swing trajectory is then performed from the other end of the head of rail to the other end of the head of rail.

3. The rail welding method according to claim 1, wherein:
   a value of the second preset distance is between 0.5 mm and 4 mm; and
   the first side wall welding length is 4 mm to 16 mm.

4. The rail welding method according to claim 1, wherein before the first swing trajectory,
   the welding gun does a linear motion to be ignited along the center line of the weld seam, and swings at an angle of 40° to 90° to the position at the first preset distance from the side wall of the bottom of rail.

5. The rail welding method according to claim 1, wherein a self-shielded flux-cored wire is used for welding.

6. The rail welding method according to claim 1, wherein a width of the weld seam is between 15 mm and 23 mm.

7. The rail welding method according to claim 1, wherein
a welding current for the bottom of rail is 170 A to 260 A, and an arc voltage is 19 V to 25.5 V, wherein a welding current for a first layer is 170 A to 210 A, and an arc voltage is 19 V to 23 V; a welding current for other layers of the bottom of rail is 200 A to 260 A, and an arc voltage is 20.5 V to 25.5 V;

a welding current for the waist of rail is 220 A to 250 A, and an arc voltage is 21 V to 25 V; and a welding current for the head of rail is 200 A to 240 A, and an arc voltage is 21 V to 25 V.

\* \* \* \* \*